(12) United States Patent
Finnah et al.

(10) Patent No.: US 11,960,195 B2
(45) Date of Patent: Apr. 16, 2024

(54) METHOD FOR MANUFACTURING AN OBJECTIVE, OBJECTIVE, AND IMAGER MODULE INCLUDING AN OBJECTIVE

(71) Applicant: Robert Bosch GmbH, Stuttgart (DE)

(72) Inventors: Guido Bernd Finnah, Weissach (DE); Joerg Engelhardt, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 11 days.

(21) Appl. No.: 17/647,349

(22) Filed: Jan. 7, 2022

(65) Prior Publication Data
US 2022/0221773 A1 Jul. 14, 2022

(30) Foreign Application Priority Data
Jan. 12, 2021 (DE) ...................... 10 2021 200 201.3

(51) Int. Cl.
| | | |
|---|---|---|
| *G03B 17/55* | (2021.01) | |
| *B08B 7/00* | (2006.01) | |
| *B29D 11/00* | (2006.01) | |
| *B60S 1/02* | (2006.01) | |
| *B60S 1/08* | (2006.01) | |
| *G02B 7/02* | (2021.01) | |
| *G02B 13/00* | (2006.01) | |
| *G02B 27/00* | (2006.01) | |
| *G03B 17/08* | (2021.01) | |
| *H04N 23/52* | (2023.01) | |
| *H04N 23/55* | (2023.01) | |

(52) U.S. Cl.
CPC .......... *G03B 17/55* (2013.01); *B29D 11/0073* (2013.01); *B60S 1/026* (2013.01); *G02B 7/028* (2013.01); *G02B 13/001* (2013.01); *G02B 27/0006* (2013.01); *H04N 23/52* (2023.01); *H04N 23/55* (2023.01); *B08B 7/0064* (2013.01); *B60S 1/0848* (2013.01); *G03B 17/08* (2013.01)

(58) Field of Classification Search
CPC ........ G03B 17/55; G03B 17/08; H04N 23/52; H04N 23/55; H04N 23/50; H04N 23/51; H04N 23/54; H04N 23/57; B29D 11/0073; G02B 7/028; G02B 13/001; G02B 27/0006; B08B 7/0064; B60S 1/0848; B60S 1/02; B60S 1/023; B60S 1/026
See application file for complete search history.

(56) References Cited

U.S. PATENT DOCUMENTS

| | | | |
|---|---|---|---|
| 9,383,540 B1 * | 7/2016 | Gandhi | ................ G02B 7/008 |
| 2017/0099700 A1 * | 4/2017 | Chae | ..................... H04N 23/52 |
| 2018/0352120 A1 * | 12/2018 | Zurowski | ............... H05K 1/189 |

(Continued)

FOREIGN PATENT DOCUMENTS

| | | | | |
|---|---|---|---|---|
| DE | 102016107545 A1 | | 10/2017 | |
| WO | WO-2020239380 A1 * | | 12/2020 | ............. F16J 15/064 |

*Primary Examiner* — Twyler L Haskins
*Assistant Examiner* — Akshay Trehan
(74) *Attorney, Agent, or Firm* — NORTON ROSE FULBRIGHT US LLP; Gerard A. Messina

(57) ABSTRACT

A method for manufacturing an objective. A component at risk of icing up, for example an optical lens or a radiation-permeable cover, is inserted into a housing and connected to, preferably braced against, the housing, by an interconnection of a heating ring made of an electrically conductive elastomer material. An objective, and an imager module that includes an objective are also description.

24 Claims, 3 Drawing Sheets

(56) References Cited

U.S. PATENT DOCUMENTS

2019/0208577 A1\* 7/2019 Chien .................... G03B 17/55
2021/0263258 A1\* 8/2021 Chen ........................ H05B 3/26
2022/0357572 A1\* 11/2022 Huang .................... H05B 3/84

\* cited by examiner

METHOD FOR MANUFACTURING AN OBJECTIVE, OBJECTIVE, AND IMAGER MODULE INCLUDING AN OBJECTIVE

CROSS REFERENCE

The present application claims the benefit under 35 U.S.C. § 119 of German Patent Application No. DE 10 2021 200 201.3 filed on Jan. 12, 2021, which is expressly incorporated herein by reference in its entirety.

FIELD

The present invention relates to a method for manufacturing an objective. Moreover, the present invention relates to an objective including a component at risk of icing up, for example an optical lens and/or a cover that is permeable to radiation or signals. Furthermore, an imager module, in particular a camera or a sensor, that includes such an objective is provided.

Cameras and/or sensors in vehicles, for example for surroundings monitoring, are a preferred field of application of the present invention.

BACKGROUND INFORMATION

Cameras or sensors that are used in vehicles are exposed to the weather, so that at low outside temperatures there is a risk of front lenses or cover glasses icing up. In this case the camera or the sensor is not ready for use, since the iced-up areas must first be deiced. For deicing or keeping the area free from ice, an electric heating device as a heat source may be mounted in the vicinity of the component at risk of icing up. At the same time, fogging up of the component may be counteracted with the aid of such heating devices.

For a camera, the lens, in particular the front lens, must be protected from icing up. For a sensor, for example an ultrasonic sensor or radar sensor, a signal-permeable cover, which is often made of plastic, is at particular risk of icing up. Therefore, upon a cold start of the vehicle the particular component may possibly have to be deiced first. If an electric heating device is used for this purpose, alternative wiper or spray systems are unnecessary.

For example, German Patent Application No. DE 10 2016 107 545 A1 describes a heating device for heating a lens of a camera and that is removably situated at a housing of the camera. The heating device includes a body that includes plastic material and conductive material, the conductive material being distributed in the plastic material in such a way that a conductive mass is formed. In addition, the heating device includes at least two electrical contacts that are in contact with the conductive mass, so that a voltage may be applied to the conductive mass.

SUMMARY

An object of the present invention is to provide an objective for an imager module, in particular a camera or a sensor, including an electric heating device, that is particularly efficient. At the same time, an object of the present invention is for the objective to be easily manufacturable in a cost-effective manner.

The object may be achieved by providing a method, and an objective in accordance with example embodiments of the present invention. Advantageous refinements of the present invention are disclosed herein. Furthermore, an imager module including an objective according to the present invention is also provided.

In a method for manufacturing an objective in accordance with an example embodiment of the present invention, a component at risk of icing up, for example an optical lens or a radiation-permeable cover is inserted into a housing and connected to, preferably braced against, the housing, by an interconnection of a heating ring made of an electrically conductive elastomer material. The heating ring thus rests on the one hand against the component at risk of icing up, and on the other hand against the housing, so that at the same time a type of seal is achieved due to the material of the heating ring. An additional seal may therefore possibly be unnecessary. The design of the objective is correspondingly simplified, so that it is easily manufacturable in a cost-effective manner. At the same time, a circumferential contact between the heating ring and the component at risk of icing up is ensured, so that uniform and rapid heating of the component is ensured via the circumferential surface contact in the event of heating. If the component and the housing are braced against one another, the surface contact between the heating ring and the component may be increased and thus improved. At the same time, this has a positive effect on the optional additional sealing function of the heating ring.

Before the component at risk of icing up is inserted into the housing, the heating ring may selectively be situated on the housing or on the component. The heating ring may already be pretensioned upon placement, so that it is already connected to the housing or to the component in a force-fit manner. In this way, slipping or twisting of the heating ring when the component is inserted into the housing is prevented. The heating ring is preferably pressed when the component is inserted into the housing, so that radial pretensioning of the heating ring with respect to the component at risk of icing up and with respect to the housing is achieved. At the same time, pretensioning of the component at risk of icing up with respect to the housing may be achieved via the heating ring.

According to one preferred specific embodiment of the present invention, the heating ring is situated or formed on the component at risk of icing up before the component is inserted into the housing. As long as the component is not yet inserted into the housing, the heating ring remains visible and thus controllable. In particular, it may be checked whether the heating ring has circumferential surface contact with the component. The seat of the heating ring may be corrected if necessary. The arrangement of the heating ring on the component may take place in one simple installation step. The formation of the heating ring on the component may be implemented in an injection process or injection molding process, for example. This has the advantage that an installation step is dispensed with.

In accordance with an example embodiment of the present invention, a component at risk of icing up including an undercut circumferential outer contour is advantageously used for the form-fit connection to the heating ring. The undercut circumferential outer contour may be formed, for example, by an annular groove on the outer circumferential side. This annular groove may have an arbitrary cross section, for example an angular or circular cross section. The heating ring then engages with the annular groove so that a form fit is achieved. The form fit counteracts slippage of the heating ring during insertion of the component into the housing. However, the undercut circumferential outer contour may also be formed by a conically shaped section of the component, with which the heating ring engages. The cone may move against a shoulder, so that a type of groove is formed in which the heating ring is accommodated, at least in sections. The heating ring is then optimally supported via the shoulder.

The undercut outer contour of the component at risk of icing up also allows an enlargement of the contact surface between the heating ring and the component. As a result, the heat is transferred from the heating ring to the component. Furthermore, the heating ring heats up during operation and expands due to thermal expansion, so that not only is the undercut area completely filled by the elastomer material of the heating ring, but also the heating ring is pressed against the outer contour of the component. The heat transfer is optimal in this case.

In addition, it is provided that the heating ring is electrically contacted at at least two locations and connected to a current-conducting part. The connection may take place directly or indirectly via a line and/or a pin. The locations for the electrical contacting are advantageously situated at the same angular distance from one another; i.e., for two locations, these locations are situated at the heating ring diametrically opposite one another. For the same angular distance, the current paths also have the same length in the circumferential direction, thus ensuring uniform heating of the heating ring along its circumference. This in turn results in uniform heating of the component at risk of icing up.

An elastomer material from the group of natural rubbers, thermoplastic elastomers, ethylene propylene diene monomer (EPDM) rubbers, fluorinated rubbers, and/or silicones is preferably selected for manufacturing the heating ring. These elastomer materials have the advantage that they crosslink. As a result of the crosslinking, the electrically conductive filler material contained in the elastomer material is nondisplaceably fixed within the network structure. At the same time, the elastomer material is able to flexibly respond to changes in temperature and associated changes in length. In particular, the elastomer material is able to expand so that the elastomer material rests with pretensioning against the component to be heated. The pretensioning optimizes the heat transfer from the heating ring to the component.

In addition, in accordance with an example embodiment of the present invention, it is provided that for manufacturing the heating ring, the elastomer material is filled with at least one electrically conductive filler, for example metallic particles, carbon black, graphite, carbon fibers, and/or carbon nanotubes. These fillers are electrically conductive and thus result in the formation of current paths within the heating ring.

Moreover, the objective provided for achieving the above-mentioned object includes a component at risk of icing up, for example an optical lens or a radiation-permeable cover, which is inserted into a housing and connected to, preferably braced against, the housing, by an interconnection of a heating ring made of an electrically conductive elastomer material. Due to interconnecting the heating ring, at the same time a seal is achieved which optionally makes an additional seal unnecessary. In this way the number of parts may be reduced, so that the objective is manufacturable comparatively easily and in a cost-effective manner. The objective is preferably manufactured according to the method according to the present invention described above.

The electrically conductive elastomer material of the heating ring also improves the surface contact between the heating ring and the component at risk of icing up, so that the heat transfer is optimized. This is particularly true when the component at risk of icing up and the housing are braced against one another so that the heating ring is pressed against the component.

Furthermore, it is provided that the component at risk of icing up includes an undercut outer contour behind which the heating ring engages. This means that the heating ring, at least in sections, rests against the undercut outer contour of the component. The heating ring preferably completely fills the undercut outer contour, so that a maximum surface contact is achieved between the heating ring and the component. This is because the larger the surface contact, the better is the heat transfer from the heating ring to the component.

The heating ring is preferably made of an elastomer material from the group of natural rubbers, thermoplastic elastomers, ethylene propylene diene monomer (EPDM) rubbers, fluorinated rubbers, and/or silicones. The advantages of these elastomer materials have already been stated above, so that reference is made thereto.

The elastomer material is also preferably filled with at least one electrically conductive filler, for example metallic particles, carbon black, graphite, carbon fibers, and/or carbon nanotubes.

The proportion of the electrically conductive filler in the electrically conductive elastomer material is preferably 10 to 70 vol %, more preferably 30 to 50 vol %, based on the total volume of the electrically conductive elastomer material. Tests have shown that the proportion of the conductor material in the elastomer material should be in the range of 10 to 70 vol % in order to achieve, as needed, sufficient heating to deice the component to be heated, but without a disproportionately high energy expenditure. A conductor material proportion in the range of 30 to 50 vol % has proven to be particularly advantageous. Via the particular mixture ratio, the specific electrical resistance of the heating device may be set, and thus adapted to the particular prevailing design boundary conditions. In addition, the typically very high coefficient of thermal expansion of the elastomeric base material may be utilized for self-regulation of the heating device within the meaning of the so-called positive temperature coefficient (PTC) effect.

Since the objective according to the present invention may be used in particular in an imager module, in addition an imager module, in particular a camera or a sensor, including an objective according to the present invention is provided.

Preferred specific embodiments of the present invention are described in greater detail below with reference to the figures.

DETAILED DESCRIPTION OF EXAMPLE EMBODIMENTS

Figure 1A:
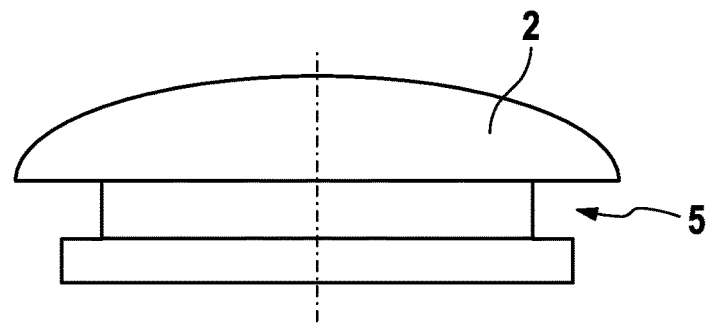
FIG. 1A shows a schematic longitudinal section of a lens for a first objective according to an example embodiment of the present invention.
Figure 1B:
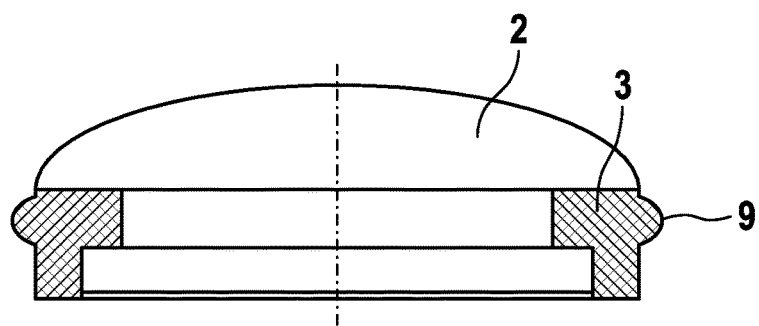
FIG. 1B shows a schematic longitudinal section of the lens from FIG. 1A with a mounted heating ring.
Figure 1C:
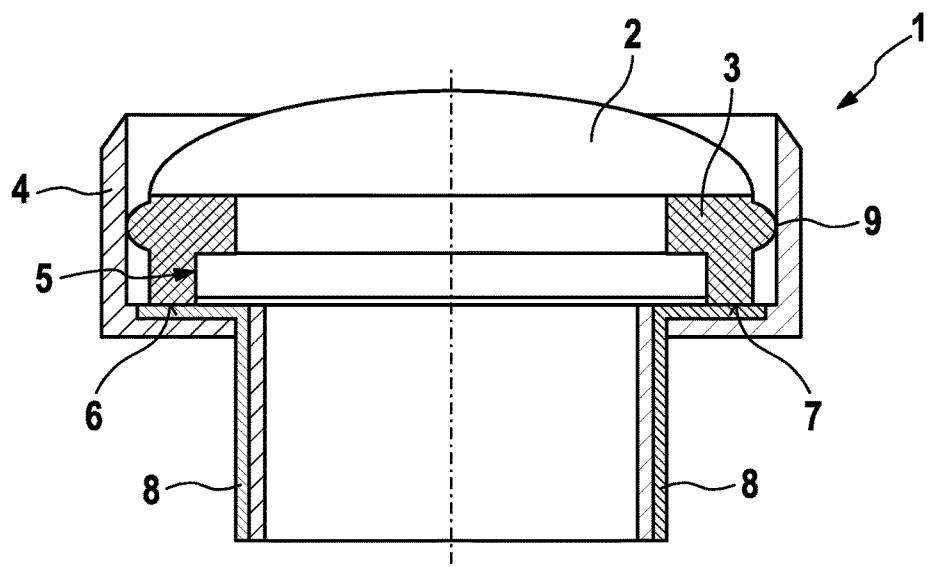
FIG. 1C shows a schematic longitudinal section of the lens from FIG. 1A with a mounted heating ring after the insertion into a housing.

The manufacture of various objectives 1 for an imager module, in particular a camera or a sensor, is described with reference to the following figures. FIGS. 1A through 1C relate to a first specific embodiment, FIGS. 2A through 2C relate to a second specific embodiment, and FIGS. 3A through 3C relate to a third specific embodiment of an objective 1 according to the present invention.

FIG. 1A shows a component 2 at risk of icing up of a first objective 1 according to the present invention. In the present case, component 2 at risk of icing up is an optical lens. The lens is to be heatable in order to keep it free of ice during subsequent operation of an imager module that includes objective 1.

For this purpose a heating ring 3 is situated on the lens, in particular in the area of an undercut outer contour 5 (cf. FIG. 1B). Heating ring 3 is made of an electrically conductive elastomer material, so that it rests with its entire surface against outer contour 5. A form fit between heating ring 3 and the lens is thus achieved due to the undercut design. In addition, the surface contact between heating ring 3 and the lens is maximized, resulting in improved heat transfer from heating ring 3 to the lens.

After heating ring 3 is mounted, the lens is inserted into a housing 4 of objective 1 (cf. FIG. 1C). A circumferential ridge 9 of heating ring 3 comes to rest against housing 4. Due to ridge 9 being radially oversized with respect to housing 4, heating ring 3 rests against housing 4 with radial pretensioning. This means that the lens and housing 4 are braced against one another via heating ring 3 that is interconnected. This results in a circumferential sealing contact between heating ring 3 and the lens, and between heating ring 3 and housing 4, so that a further seal in this area is not necessary.

To supply heating ring 3 with current, the heating ring includes at least two locations 6, 7 on its bottom side for electrical contacting. Locations 6, 7 are situated diametrically opposite one another, so that the current paths through heating ring 3 have equal lengths and heating ring 3 is uniformly heated when current is supplied. Heating ring 3 expands upon heating, so that an additional pressing force is generated which keeps heating ring 3 in optimal surface contact with the lens. All these factors contribute to uniform and rapid heating of the lens. In the present case, the electrical contacting of locations 6, 7 takes place with the aid of electrical conductors 8 which, for example, may be led to a circuit board (not illustrated) of an imager module that includes objective 1.

Figure 2A:
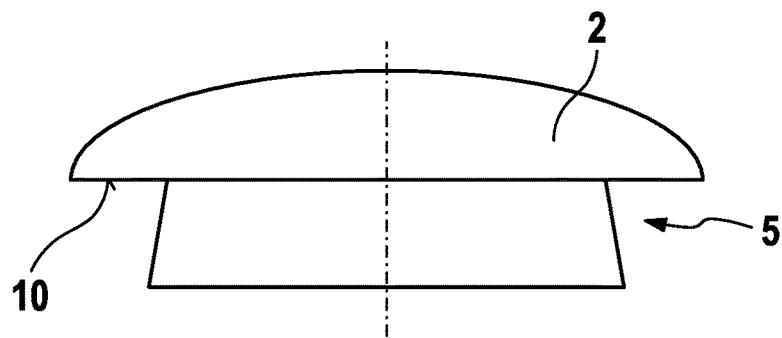
FIG. 2A shows a schematic longitudinal section of a lens for a second objective according to an example embodiment of the present invention.

FIG. 2A shows a further lens as component 2 at risk of icing up, which likewise includes an undercut outer contour 5 for accommodating a heating ring 3. While the lens from FIGS. 1A through 1C includes a circumferential annular groove for forming undercut outer contour 5, the lens from FIGS. 2A through 2C forms a conically shaped section that moves against a shoulder 10. A type of annular groove is likewise formed in this way.

Figure 2B:
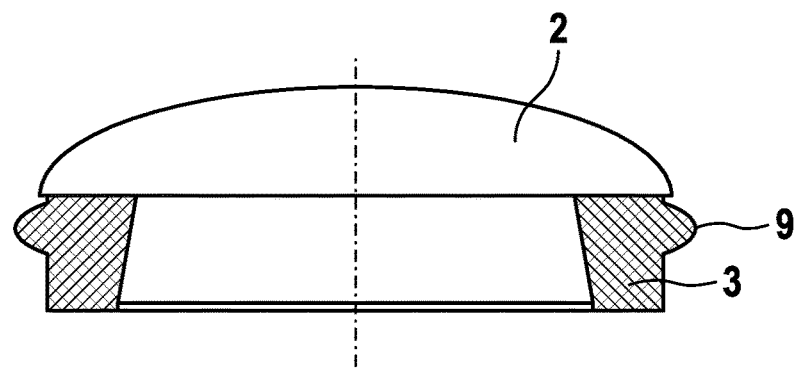
FIG. 2B shows a schematic longitudinal section of the lens from FIG. 2A with a mounted heating ring.
Figure 2C:
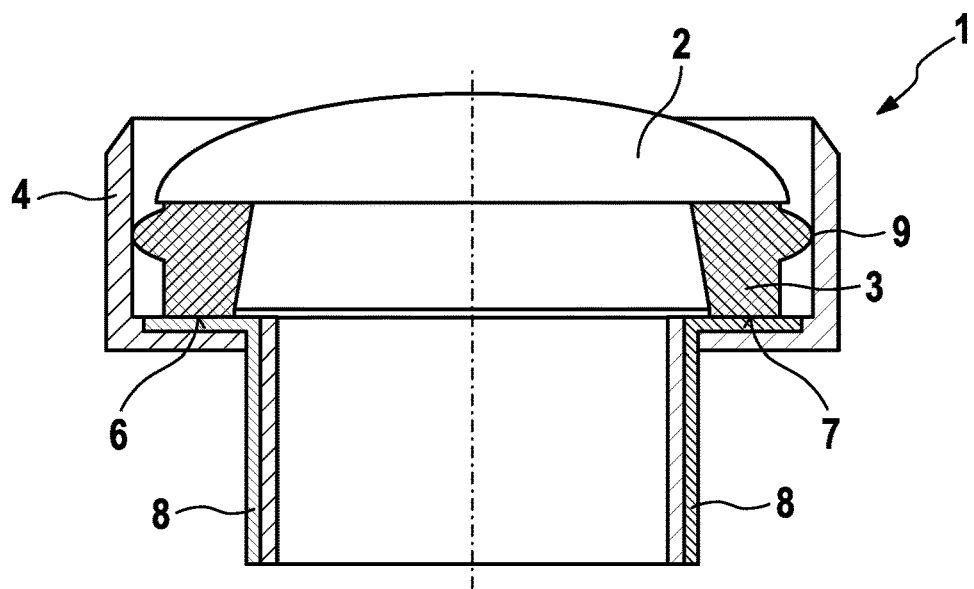
FIG. 2C shows a schematic longitudinal section of the lens from FIG. 2A with a mounted heating ring after the insertion into a housing.

Heating ring 3 is situated on the conically shaped section of the lens in such a way that the heating ring is supported in the axial direction via shoulder 10 (cf. FIG. 2B).

When the lens is subsequently inserted into a housing 4 (cf. FIG. 2C), a ridge 9 of heating ring 3 comes into contact with housing 4, preferably under radial pretensioning. This is because the radial pretensioning effectuates elastic deformation of heating ring 3, which increases the contact pressure of heating ring 3 against the lens, in particular in the area of undercut outer contour 5 as well as in the area of shoulder 10. The same advantages described above in conjunction with the specific embodiment from FIGS. 1A through 1C are thus achieved. The electrical contacting takes place at locations 6, 7 via electrical conductors 8, analogously to FIG. 1C.

Figure 3A:
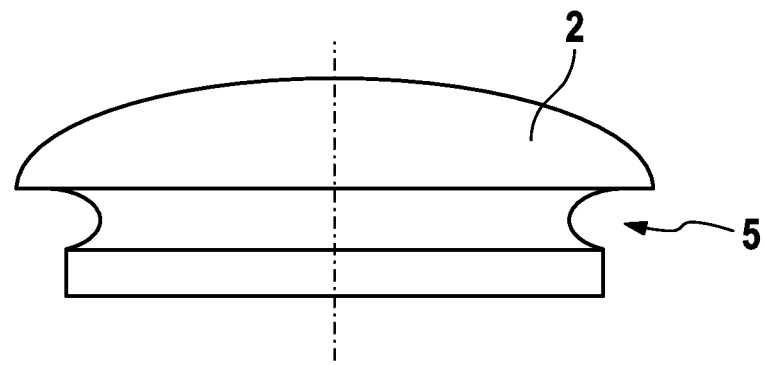
FIG. 3A shows a schematic longitudinal section of a lens for a third objective according to an example embodiment of the present invention.
Figure 3B:
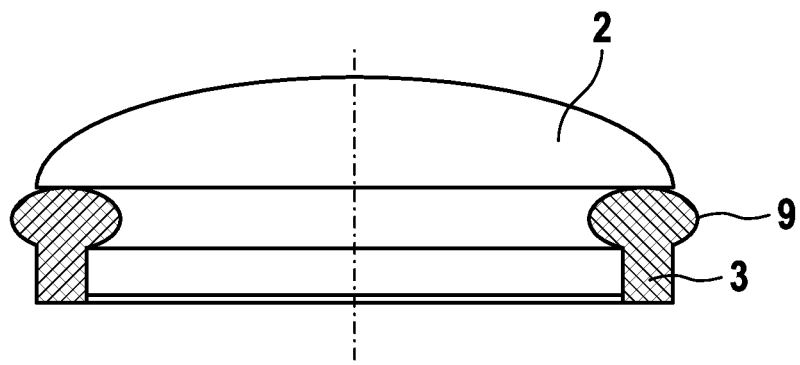
FIG. 3B shows a schematic longitudinal section of the lens from FIG. 3A with a mounted heating ring.
Figure 3C:
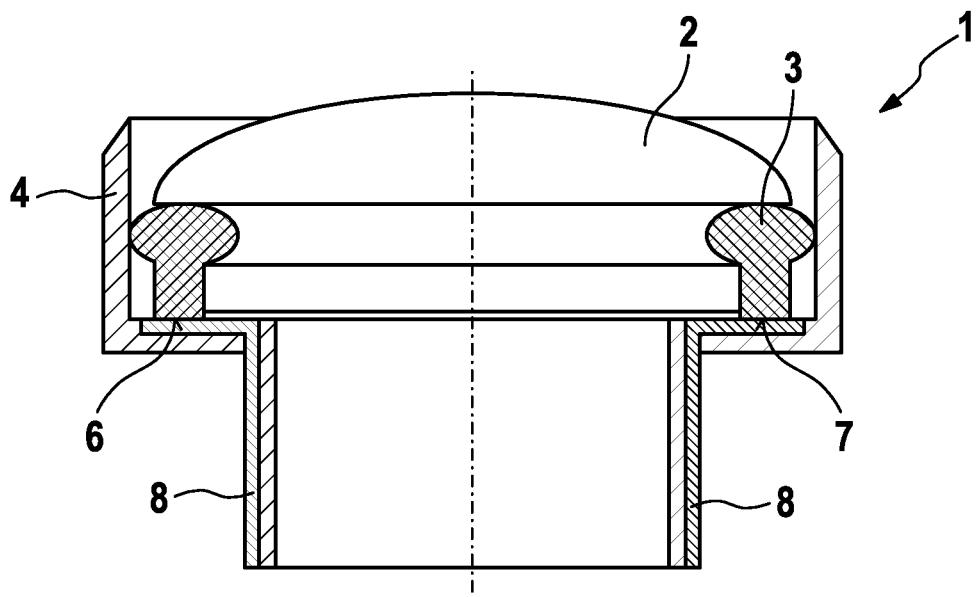
FIG. 3C shows a schematic longitudinal section of the lens from FIG. 3A with a mounted heating ring after the insertion into a housing.

FIG. 3A shows a lens for an objective 1 that does not differ significantly from the lens from FIG. 1A. Here as well, undercut outer contour 5 of the lens is achieved via a circumferential annular groove. However, in contrast to FIG. 1A, the annular groove has a circular, not an angular, cross section. The circular cross section facilitates heating ring 3 resting with its full surface against the outer contour. In addition, a uniform pressing force is achievable which presses heating ring 3 against outer contour 5 (cf. FIG. 3B). After heating ring 3 is mounted, the lens is inserted into a housing 4, a ridge 9 of heating ring 3 coming to rest against housing 4, preferably under radial pretensioning, in order to generate an additional pressing force. In other respects, the example from FIGS. 3A through 3C has a design that is analogous to that from FIGS. 1A through 1C.

What is claimed is:

1. A method for manufacturing an objective, the method comprising:
    inserting a component at risk of icing up into a housing, and connecting the component at risk of icing up to the housing by an interconnection of a heating ring made of an electrically conductive elastomer material;
    wherein:
    (a) a radial extension of the component at an axially central region of the component is less than respective radial extensions of the component at each of first and second axial points of the component axially surrounding the axially central region; and
    (b) the heating ring (i) includes an exterior circumferential surface that has a radial protrusion that protrudes exteriorly from a recessed section of the exterior circumferential surface and (ii) is arranged around the component so that the protrusion is in the axially central region and the recessed section is at least partly in one of the first and second axial points so that, after the inserting, the radial protrusion causes the heating ring to press radially inward against the component in the axially central region.

2. The method as recited in claim 1, wherein the component at risk of icing up is an optical lens or a radiation-permeable cover.

3. The method as recited in claim 1, wherein the component at risk of icing up is braced against the housing by the interconnection of the heating ring.

4. The method as recited in claim 1, wherein the heating ring is situated or formed on the component at risk of icing up, prior to the component at risk of icing up being inserted into the housing.

5. The method as recited in claim 4, wherein the heating ring is situated or formed on the component at risk of icing up by an injection process or injection molding process.

6. The method as recited in claim 1, wherein the component at risk of icing up includes an undercut circumferential outer contour for a form-fit connection to the heating ring.

7. The method as recited in claim 1, wherein the heating ring is electrically contacted at at least two locations and connected to a current-conducting part.

8. The method as recited in claim 1, wherein the elastomer material is selected from a group consisting of: natural rubbers, thermoplastic elastomers, ethylene propylene diene monomer rubbers, fluorinated rubbers, and silicones.

9. The method as recited in claim 1, wherein for manufacturing the heating ring, the elastomer material is filled with at least one electrically conductive filler.

10. The method as recited in claim 9, wherein the at least one electrically conductive filler includes metallic particles, and/or carbon black, and/or graphite, and/or carbon fibers, and/or carbon nanotubes.

11. The method as recited in claim 1, wherein the inserting radially inwardly deforms the radially exterior surface of the heating ring selectively in the axially central region.

12. An objective, comprising:
a housing; and
a component at risk of icing up which is inserted into the housing and connected to the housing by an interconnection of a heating ring made of an electrically conductive elastomer material;
wherein
(a) a radial extension of the component at an axially central region of the component is less than respective radial extensions of the component at each of first and second axial points of the component axially surrounding the axially central region; and
the heating ring (i) includes an exterior circumferential surface that has a radial protrusion that protrudes exteriorly from a recessed section of the exterior circumferential surface and (ii) is arranged around the component so that the protrusion is in the axially central region and the recessed section is at least partly in one of the first and second axial points so that the heating ring is pressed, by the radial protrusion, radially inward against the component in the axially central region.

13. The objective as recited in claim 12, wherein the component at risk of icing up is an optical lens or a radiation-permeable cover.

14. The objective as recited in claim 12, wherein the component at risk of icing up is braced against the housing by the interconnection of the heating ring.

15. The objective as recited in claim 12, wherein the component at risk of icing up includes an undercut circumferential outer contour behind which the heating ring engages.

16. The objective as recited in claim 12, wherein the heating ring is manufactured from an elastomer material selected from a group consisting of: natural rubbers, thermoplastic elastomers, ethylene propylene diene monomer (EPDM) rubbers, fluorinated rubbers, and silicones.

17. The objective as recited in claim 16, wherein the elastomer material is filled with at least one electrically conductive filler.

18. The objective as recited in claim 17, wherein the at least one electrically conductive filler includes: metallic particles, and/or carbon black, and/or graphite, and/or carbon fibers, and/or carbon nanotubes.

19. The objective as recited in claim 12, wherein a proportion of conductor material in the electrically conductive elastomer material is 10 to 70 vol % based on a total volume of the electrically conductive elastomer material.

20. The objective as recited in claim 12, wherein a proportion of conductor material in the electrically conductive elastomer material is 30 to 50 vol % based on a total volume of the electrically conductive elastomer material.

21. The objective as recited in claim 12, wherein the heating ring and the axial region of the housing at which the heating ring are structured such that:
prior to the insertion of the heating ring into the housing, a radial extension of the heating ring is greater than an interior width of the housing in the axially central region; and
when the heating ring is inserted into the housing, the insertion causes a radial inward deformation of the exterior surface of the heating ring selectively in the axially central region.

22. The objective as recited in claim 12, wherein the one of the first and second axial points is within an axial region in which an exterior of the component radially tapers.

23. The objective as recited in claim 22, wherein the axially central region is also within the axial region in which the exterior of the component radially tapers.

24. An imager module, comprising:
an objective, including:
a housing, and
a component at risk of icing up which is inserted into the housing and connected to the housing by an interconnection of a heating ring made of an electrically conductive elastomer material;
wherein:
the imager module is a camera or sensor;
a radial extension of the component at an axially central region of the component is less than respective radial extensions of the component at each of first and second axial points of the component axially surrounding the axially central region; and
the heating ring (i) includes an exterior circumferential surface that has a radial protrusion that protrudes exteriorly from a recessed section of the exterior circumferential surface and (ii) is arranged around the component so that the protrusion is in the axially central region and the recessed section is at least partly in one of the first and second axial points so that the heating ring is pressed, by the radial protrusion, radially inward against the component in the axially central region.

* * * * *